United States Patent
Hoffmann et al.

(10) Patent No.: US 9,639,528 B1
(45) Date of Patent: May 2, 2017

(54) TRANSLATION-BASED VISUAL DESIGN

(71) Applicant: SAP SE, Walldorf (DE)

(72) Inventors: Florian Hoffmann, Oftersheim (DE); Michail Vasiltschenko, Schriesheim (DE); Jochen Geib, Speyer (DE); Benjamin Schork, Wilhelmsfeld (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/010,291

(22) Filed: Jan. 29, 2016

(51) Int. Cl.
*G06F 17/28* (2006.01)
*G06F 9/44* (2006.01)
*G06F 17/24* (2006.01)
*G10L 15/26* (2006.01)

(52) U.S. Cl.
CPC .......... *G06F 17/289* (2013.01); *G06F 9/4448* (2013.01); *G06F 17/241* (2013.01); *G06F 17/2836* (2013.01); *G10L 15/26* (2013.01)

(58) Field of Classification Search
CPC .. G06F 17/241; G06F 17/2836; G06F 17/289; G06F 9/4448; G06F 11/3668; G06F 17/2264; G06F 17/28; G06F 17/2872; G06F 8/38; G10L 15/26
USPC ........... 704/2, 3, 7, 8, 9, 277; 709/206, 204; 382/305, 309, 310; 455/556.1; 707/769, 707/812; 715/236, 252, 753, 763, 810
See application file for complete search history.

(56) References Cited

U.S. PATENT DOCUMENTS

| | | |
|---|---|---|
| 6,279,018 B1 | 8/2001 | Kudrolli et al. |
| 6,452,597 B1 | 9/2002 | Goldberg et al. |
| 6,470,306 B1 * | 10/2002 | Pringle ................ G06F 17/241 704/3 |
| 7,398,203 B2 | 7/2008 | Corston-Oliver et al. |
| 8,225,201 B2 | 7/2012 | Michael |
| 8,290,312 B2 * | 10/2012 | Ohguro ................ G06F 17/241 358/1.9 |

(Continued)

FOREIGN PATENT DOCUMENTS

WO   2009001338 A2   12/2008

OTHER PUBLICATIONS

Internet article entitled "Globalization Step-by-Step," retrieved from https://msdn.microsoft.com/en-in/goglobal/ob688140.aspx, printed on Oct. 5, 2015.

(Continued)

*Primary Examiner* — Vijay B Chawan
(74) *Attorney, Agent, or Firm* — Fountainhead Law Group P.C.

(57) ABSTRACT

The embodiments may be adapted to accommodate a plurality of translations of a source text string into a limited available display area of a visual element in a graphical interface of a client system. Text strings in a source language may be received as input. A list of one or more languages selected for the text string to be translated into may also be received as input. The system may then be configured to obtain translations of the text string in the selected languages, to provide a set of translation vectors, and to calculate a minimum display area necessary for a visual element to display the longest translation of the translations contained in the translation vector. The display area of the visual element may then be adjusted to encompass the minimum display area so that the longest translation fits within the display area of the visual element.

20 Claims, 12 Drawing Sheets

Translation Vector Selection Menu 224

| | English | Chinese | French | Spanish | German | Russian | |
|---|---|---|---|---|---|---|---|
| 210 | send | 發送 | envoyer | enviar | senden | отправлять | 212 |
| | send | 送 | expédier | enviar | schicken | послать | |
| | send | 发 | lancer | enviar | versenden | посылать | |

(56) References Cited

U.S. PATENT DOCUMENTS

| | | | |
|---|---|---|---|
| 8,775,526 B2* | 7/2014 | Lorch | H04M 1/7253 455/556.1 |
| 8,935,147 B2 | 1/2015 | Stern et al. | |
| 2002/0087985 A1 | 7/2002 | Kamen et al. | |
| 2002/0133523 A1 | 9/2002 | Ambler et al. | |
| 2008/0059877 A1 | 3/2008 | Brookler et al. | |
| 2009/0296124 A1* | 12/2009 | Ohguro | G06F 17/241 358/1.9 |
| 2010/0179991 A1* | 7/2010 | Lorch | H04M 1/7253 709/206 |
| 2011/0179073 A1* | 7/2011 | Nilsson | G06F 9/4448 707/769 |
| 2003/0271471 | 10/2013 | Schorsch | |
| 2013/0262080 A1* | 10/2013 | Marciano | G06F 17/2836 704/3 |
| 2014/0006004 A1* | 1/2014 | Gundepuneni | G06F 17/2264 704/2 |
| 2014/0325000 A1* | 10/2014 | Lorch | H04M 1/7253 709/206 |
| 2015/0303941 A1 | 10/2015 | Hayes | |

OTHER PUBLICATIONS

Internet article entitled "Internationalizing the User Interface," retrieved from hhttps://developer.apple.com/library/ios/documentation/MacOSX/Conceptual/BPInternational/InternationalizingYour UserInterface/InternationalizingYourUserInterface.html Published Sep. 9, 2009.

Simon corston-Oliver, Microsoft Research, "Text compaction for Display on Very Small Screens," available from http://microsoft.com. 2001.

David Kirk Evans, "Identifying Similarity in Text: Multil-Lingual Analysis for Summarization," submitted in partial fulfillment of the requirements for the degree of Doctor of Philosophy in the Graduate School of Arts and Sciences, Columbia University, 2005.

Yeongkil Song and Harksoo Kim, research article "Lightweight word Spacing Model Based on short text Messages for Social Networking in Smart Homes," International Journal of Distributed Sensor Networks, vol. 2014 (2014).

Article entitled "Truncating Long Text Labels—Best Practices?" retrieved from Spunkypixels, at http://ux.stackexchange.com/questions/28109/truncating-long-text-labels-best-practices. retrieved and printed on Apr. 13, 2016.

U.S. Appl. No. 15/211,870, filed Jul. 15, 2016, entitled "Intelligent Text Reduction for Graphical Interface Elements," by inventors Michail Vasiltschenko, Ralph Debusmann, Florian Hoffmann, Iuliia Konstantinova, Christian Lieske, and Charles Monte—Not yet published and not presented herewith.

U.S. Appl. No. 15/211,920, filed Jul. 15, 2016, entitled "Design Time User Interface with Intelligent Text Reduction," by inventors Michail Vasiltschenko, Ralph Debusmann, Florian Hoffmann, Iuliia Konstantinova, Christian Lieske, and Charles Monte—Not yet published and not presented herewith.

* cited by examiner

Translation Vector Selection Menu 224

| English | Chinese | French | Spanish | German | Russian |
|---------|---------|--------|---------|--------|---------|
| send | 發送 | envoyer | enviar | senden | отправлять |
| send | 送 | expédier | enviar | schicken | послать |
| send | 发 | lancer | enviar | versenden | посылать |

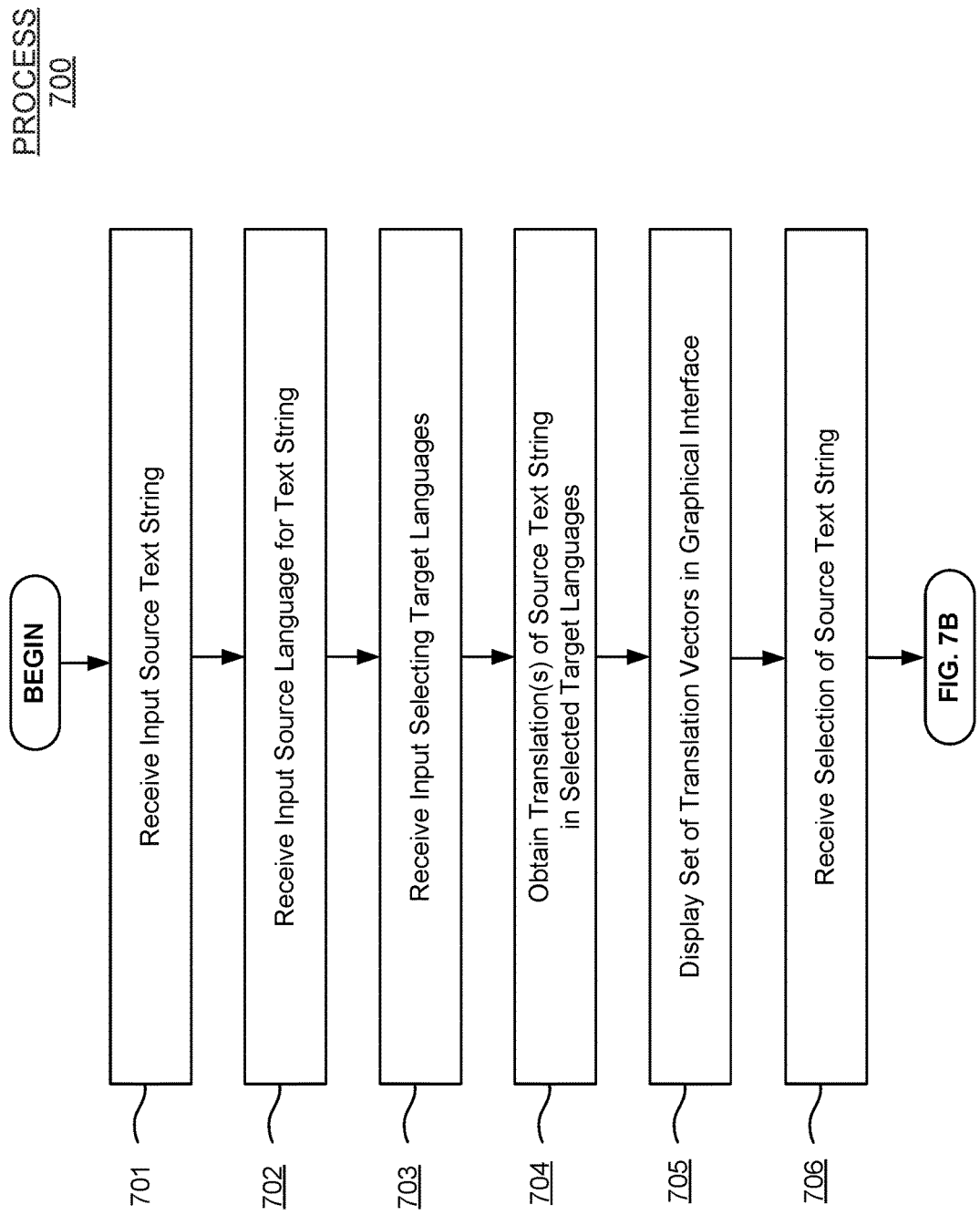

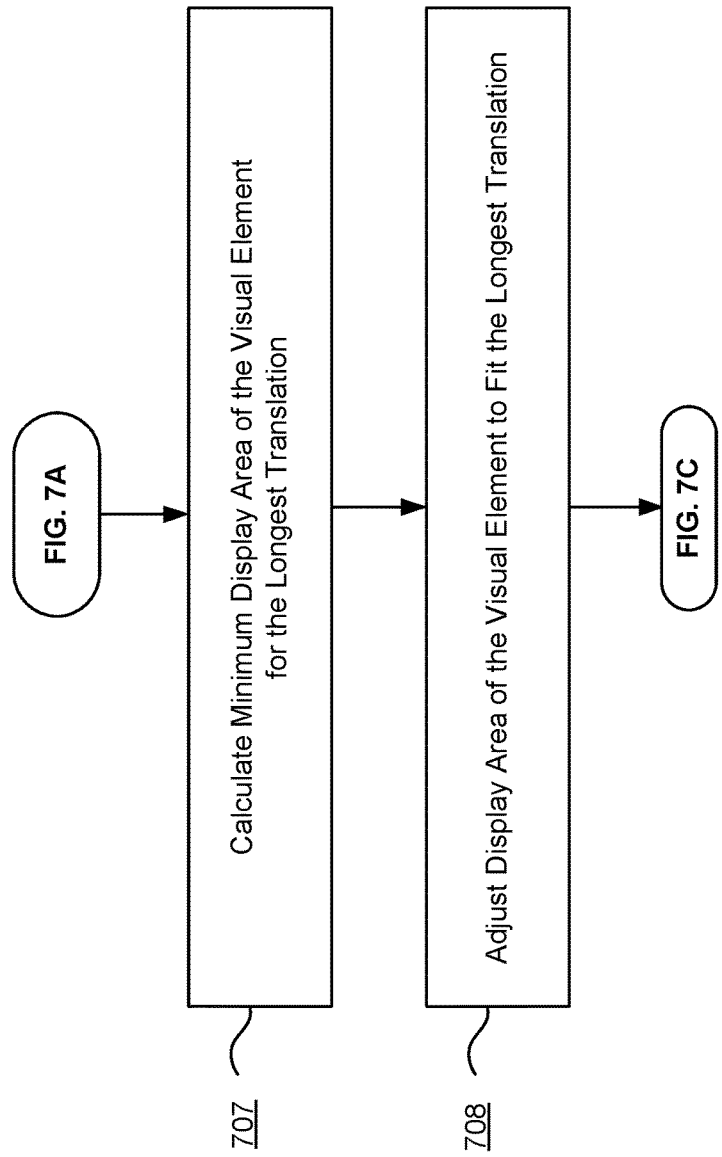

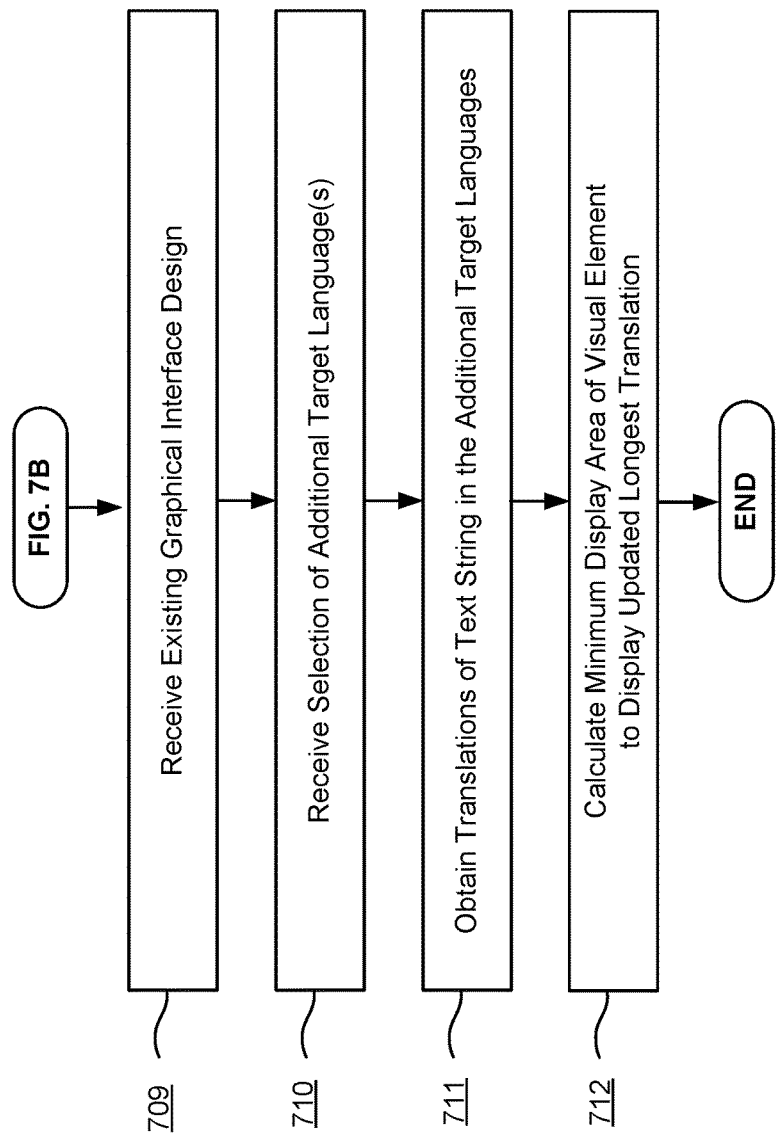

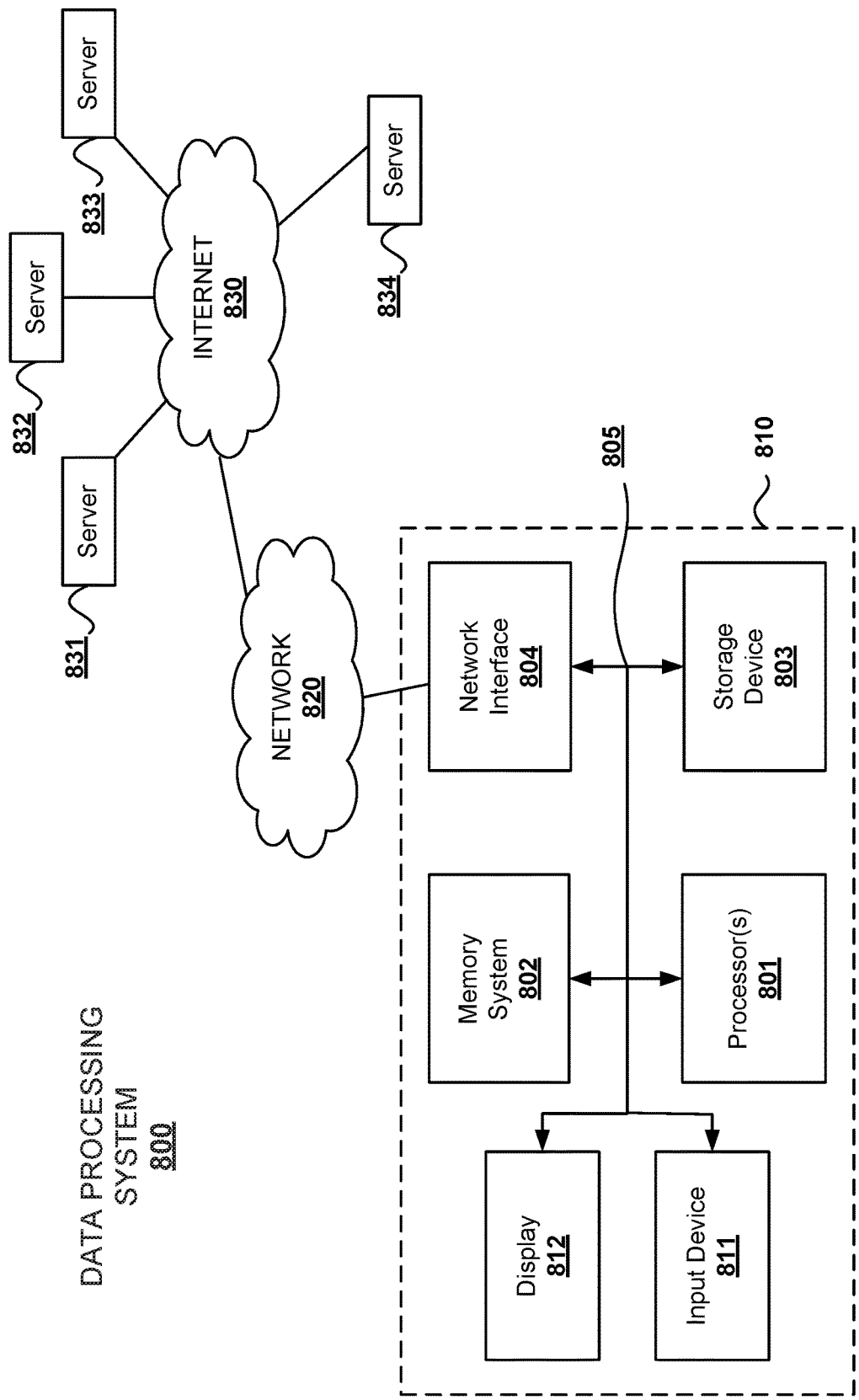

TRANSLATION-BASED VISUAL DESIGN

TECHNICAL FIELD

At least certain embodiments disclosed herein relate generally to visual design, and particularly to providing a minimum display area for displaying a text string to be translated into a plurality of languages.

BACKGROUND

Condensing large amounts of information into small available spaces is one of the major challenges in visual design. In many cases, this results in a tendency to make things as small as possible. This tendency causes problems in translation because it forces translators to find words that not only optimally translate the source text, but also fit into the available space. This may result in clipped text, non-optimal translations, unintelligible abbreviations, or even untranslated or garbled text strings in translated visual designs that look bad or even ridiculous in other languages. If the translated text does not fit into the available display area, it may be abbreviated, cut off, or even remain untranslated or return distorted text in the graphical display. FIG. 1 depicts some examples of the problems experienced in visual design text translation. A button in a webpage display may be given exactly the minimum required width and height to accommodate the word "Send" in English in order to fit in numerous other visual elements beside it in the graphical display. In this example, the resulting button is too small to accommodate the German translation "Senden". The visual designer will therefore have to look for an abbreviation like "Send." or "Se . . . n" as shown in the figure. This will result in a less than optimal look for the webpage in German.

In addition, the shorter the source text, the smaller the available space, and the harder it may be to find a suitable alternative translation or abbreviation. Paradoxically, the more effort spent on the design—and thus the exploitation of the available space—the worse the situation can become. Even more paradoxically, visual designers with different native languages tend to choose English as lingua franca. But English has a tendency toward short words. Visual elements optimized to accommodate an English text are in many cases therefore too narrow to accommodate translations in more elaborate languages such as Italian.

Further, translation does not always result in a one-to-one correspondence between the source and target languages. A single word in English can have multiple translations in another language. For instance, the word "supply" in English can have varying translations in Spanish depending on whether the word is used as a verb or a noun. Even within the verb and noun categories themselves, the Spanish translation may differ depending on the particular context. On the other hand, certain English words might have only a single meaning in another language. What's more, in addition to semantic variations among words from one language to another, adjectives and articles may sometimes change spelling according to the gender of the nouns. Therefore, when re-using a text string in multiple places, visual designers need to ensure that the text string is translated in such a way that the text translation is correct for a given context.

In addition to text that increases in length when it is translated, font size can differ among language groups. For instance, East Asian languages usually display text in a larger font size than many other language groups. As used herein the terms "font" and "font size" may refer to (1) font type such as "Arial", (2) font sub-types such as "Arial Narrow", (3) font weight such as "bold", (4) font style such as "italic", (5) letter-spacing such as 125%, or (6) font size (=height) such as 12 pt. All of these properties may influence the horizontal width of the text, although this may differ based on the font used.

Furthermore, although this problem has been described in terms of software development in the visual design of graphical user interfaces for websites, desktop applications, mobile apps, etc., the problem is not so limited—the same issues may arise wherever visual design meets translation. For example, in the print layout of comic books, translations need to fit into limited sized speech balloons. In other cases, captions like "prewash" on washing machine displays need to be translated such that the text still fits within the various knobs and buttons.

This affects the size of the graphical interface controls that display the text strings and potentially necessitates relocating and resizing the user interface controls. The best way to ensure that a graphical design has a consistent look and feel throughout different translated versions is for the development team to design it with resizing and other required target language variances in mind.

SUMMARY

The embodiments described herein include improved methods, systems and computer readable media for accommodating a plurality of translations of a source text string into a limited available display area of a visual element in a graphical interface display of a client computer system. In one embodiment a method is disclosed comprising receiving an input source text string in a display area of a visual element, receiving input specifying a source language for the source text string, receiving input selecting one or more languages for the source text string to be translated into, obtaining translations of the source text string in the selected languages, and displaying, in response to the input source text string, a set of one or more translation vectors. Each translation vector may include one possible translation of the source text string for each of the selected languages.

The method further comprises receiving a selection of a translation vector that contains a translation of the source text string corresponding to an intended meaning of the source text string and calculating a minimum display area necessary for the visual element to display the longest translation contained in the selected translation vector. The display area of the visual element in the graphical interface may then be adjusted to encompass the minimum display area such that the longest translation fits within the display area of the visual element.

The minimum display area may correspond to a minimum length of the longest translation. The minimum length of the longest translation may be selected from the number of characters, number of pixels, or number of EM units required to display the longest translation in the visual element. The set of translation vectors may comprise alternative translations of the source text string to account for ambiguities in the source language.

In one embodiment, the method may further comprise receiving an existing graphical interface design including an existing visual element having a display area containing an existing source text string, receiving a selection of additional languages for the existing source text string to be translated into, obtaining translations of the source text string in the selected additional languages, and calculating a minimum display area necessary for the existing visual element to display an updated longest translation of the existing source text string to fit within the display area of the existing visual element.

In one embodiment, the method may further comprise communicating a request to a server over a communications network to retrieve the set of translation vectors, and receiving a response from the server comprising the set of translation vectors. The server may be adapted to query a translations database to retrieve the set of translation vectors.

In one embodiment, the method may further comprise receiving an input weighting factor for each of the selected languages to be translated indicating its level of importance, comparing the input weighting factor to a threshold, and removing outlier translations with weighting factors below the threshold.

In one embodiment, the method may further comprise receiving an existing graphical interface design comprising one or more existing visual elements, and testing the existing graphical interface design by calculating a minimum display area necessary for a longest translation in each of the existing visual element in the existing design. The display area of the visual element in the graphical interface may be adjusted either manually by a user or automatically by a user interface text space calculation unit. The source text string may comprise a font type and a font size.

In another embodiment, a system is disclosed comprising a computer device comprising a processor, graphical interface, and a system memory in communication with the processor via a communication medium. The system memory may be configured to store programmed computer code, which when executed by the processor, causes the processor to perform operations for accommodating a plurality of translations of a source text string into a limited available display area of a visual element in the graphical interface. In one embodiment, the operations may comprise receiving an input source text string in the display area of the visual element, receiving input specifying a source language for the source text string, receiving input selecting one or more languages for the source text string to be translated into, obtaining translations of the source text string in the selected languages, displaying, in response to the input source text string, a set of one or more translation vectors, receiving a selection of a translation vector that contains a translation of the source text string corresponding to an intended meaning of the source text string, and calculating a minimum display area necessary for the visual element to display a longest translation of the translations contained in the selected translation vector. Each translation vector may include one possible translation of the source text string for each of the selected languages. The display area of the visual element in the graphical interface may then be adjusted to encompass the minimum display area such that the longest translation fits within the display area of the visual element.

In yet other embodiments a computer readable storage medium is disclosed embodying programmed computer code, which when executed by a computer system, causes the computer system to perform operations for accommodating a plurality of translations of a source text string into a limited available display area of a visual element in a graphical interface of a client computer system. In one embodiment, the operations may comprise receiving an input source text string in the display area of the visual element, receiving input specifying a source language for the source text string, receiving input selecting one or more languages for the source text string to be translated into, obtaining translations of the source text string in the selected languages, displaying, in response to the input source text string, a set of one or more translation vectors, each translation vector comprising one possible translation of the source text string for each of the selected languages, receiving a selection of a translation vector that contains a translation of the source text string corresponding to an intended meaning of the source text string, and calculating a minimum display area necessary for the visual element to display a longest translation of the translations contained in the selected translation vector. Each translation vector may include one possible translation of the source text string for each of the selected languages. The display area of the visual element in the graphical interface may then be adjusted to encompass the minimum display area such that the longest translation fits within the display area of the visual element.

The following detailed description and accompanying drawings provide a better understanding of the nature and advantages of the present disclosure.

BRIEF DESCRIPTION OF THE DRAWINGS

For a better understanding of at least certain embodiments, reference will be made to the following detailed description, which is to be read in conjunction with the accompanying drawings.

FIG. 2B depicts an example embodiment of a translation vector selection menu comprising a plurality of translation vectors configured according to the techniques described herein.

FIGS. 7A-7C depict flow charts of an example embodiment of a process for accommodating a plurality of translations of a source text string into a limited available display area of a visual element in a graphical interface of a client computer system according to the techniques described herein.

FIG. 8 depicts an example overview block diagram of a data processing system upon which the embodiments described herein may be implemented.

DETAILED DESCRIPTION

Figure 1:
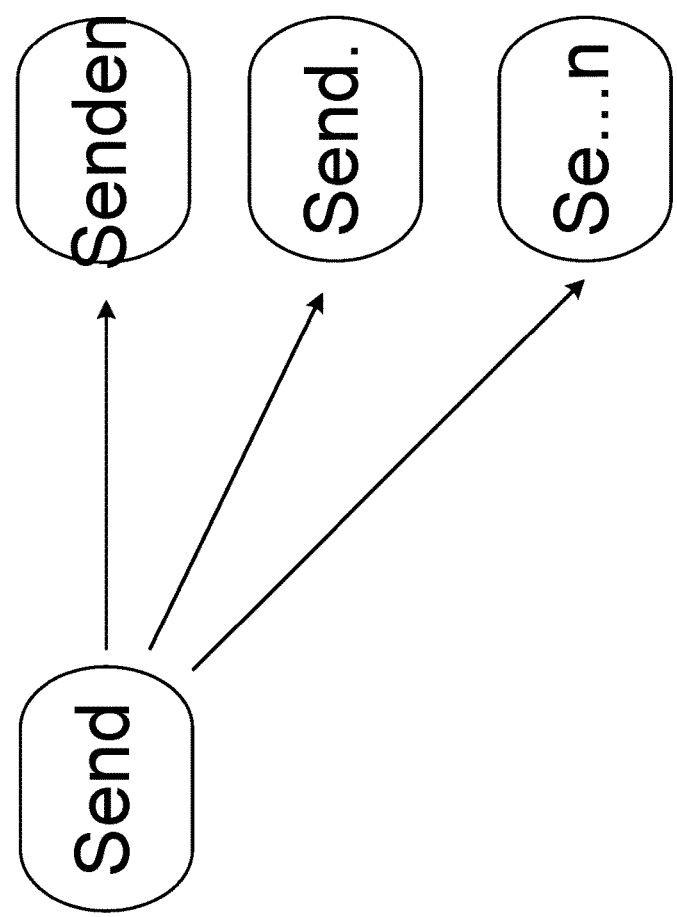
FIG. 1 depicts some examples of problems experienced in visual design text translation according to prior art techniques.

Throughout the description, for the purposes of explanation, numerous specific details are set forth in order to provide a thorough understanding of the present disclosure. It will be apparent to one skilled in the art, however, that the techniques described herein may be practiced without some of these specific details. In other instances, well-known structures and devices may be shown in block diagram form to avoid obscuring the novel principles and techniques described herein.

The novel embodiments of the techniques described herein involve systems, methods, and computer readable media adapted to accommodate a plurality of translations of a source text string into a limited available display area of a visual element in a graphical interface of a client computer system. The embodiments described herein provide a simple solution to text-related user interface problems discussed above. These techniques can be used to determine the optimum length to provide to accommodate the translations of a text string into a display area of a visual element of a graphical interface. The visual element may include, for example, a dialog box, a selection menu, a selection tab, a label, a banner, a widget, a window, or any component part of a graphical interface.

These novel embodiments include a user interface ("UI") text space calculation unit described below that can provide visual designers and graphical interface developers with adequate space to accommodate other language versions in their designs. The UI text space calculation unit enables users (e.g., developers and quality managers) to quickly and easily identify the optimum amount of UI space for their texts in their projects, allowing them to both create perfect-length new UI designs and to proactively test and correct any issues in existing designs. The calculator logic can also be used to check the property files of existing applications to identify text string lengths to make a significant difference in the quality of a UI. With such embodiments there is no need for additional work after translation, and there are fewer corrections to be made such that the user experience can be the same in each of the supported languages.

As used herein the term "language" may refer to (1) natural languages such as English, (2) language variants such as American English, (3) regional dialects such as Cockney, (4) artificial languages such as Esperanto, (5) invented languages such as "Lorem ipsum dolor sit amet," (6) dead languages such as Latin, or (7) stylistic language variants such as ghetto slang in English, etc.

Use cases for the UI text space calculation unit logic are numerous and may include designing new graphical interfaces, re-using existing graphical interfaces with existing text strings, quality checks for new or existing graphical interfaces, and for simulating existing graphical designs into additional new languages. The calculator logic can also be used for estimating effort when a new language has to be added.

In addition, there are numerous other use cases. Users can upload translation memories, text strings, own terminology, etc., into a text repository and obtain recommendations from the system. If a text string is not available in a user's domain, it can be delivered to the user via the embodiments described herein. Further, the calculator logic can be used in user interface design tools like "Axure", for example, as an Add-In. Additionally, the calculator logic can be used for the existing applications or programs. For example, embodiments may be adapted to check properties files in an existing application and deliver the lines which need to be extended due to translation.

The calculator logic can also be used for automated tests for the user interfaces before a development is released (like an activation check). Additionally, the calculation logic can be used for the development of controls or templates, which are used by developers to ensure that problems are not replicated. The calculator logic can also be used for checking existing translation memories in order to find and sort out the translations which are actually abbreviations that occurred only because of the limited space. Moreover, the calculator logic can be used for PowerPoint presentations and other slides or tools in order to reduce the post-editing effort required after translation. Embodiments can also be used when a user interface of a new product cannot be localized and translated for certain markets due to language restrictions. Other use cases are possible, and this list is not intended to be exhaustive.

Most designs are created with a limited scope of target languages in mind. Even more commonly, the range of languages may evolve over time, increasing from one or two to possibly dozens or hundreds of target languages. To accommodate this, the designer (or product owner, director, manager, etc.) may choose the range of target languages. For example, a new startup company may decide to first release its software in its local language only. And then move into international markets after their revenue justifies additional spending on translations.

Figure 2A:
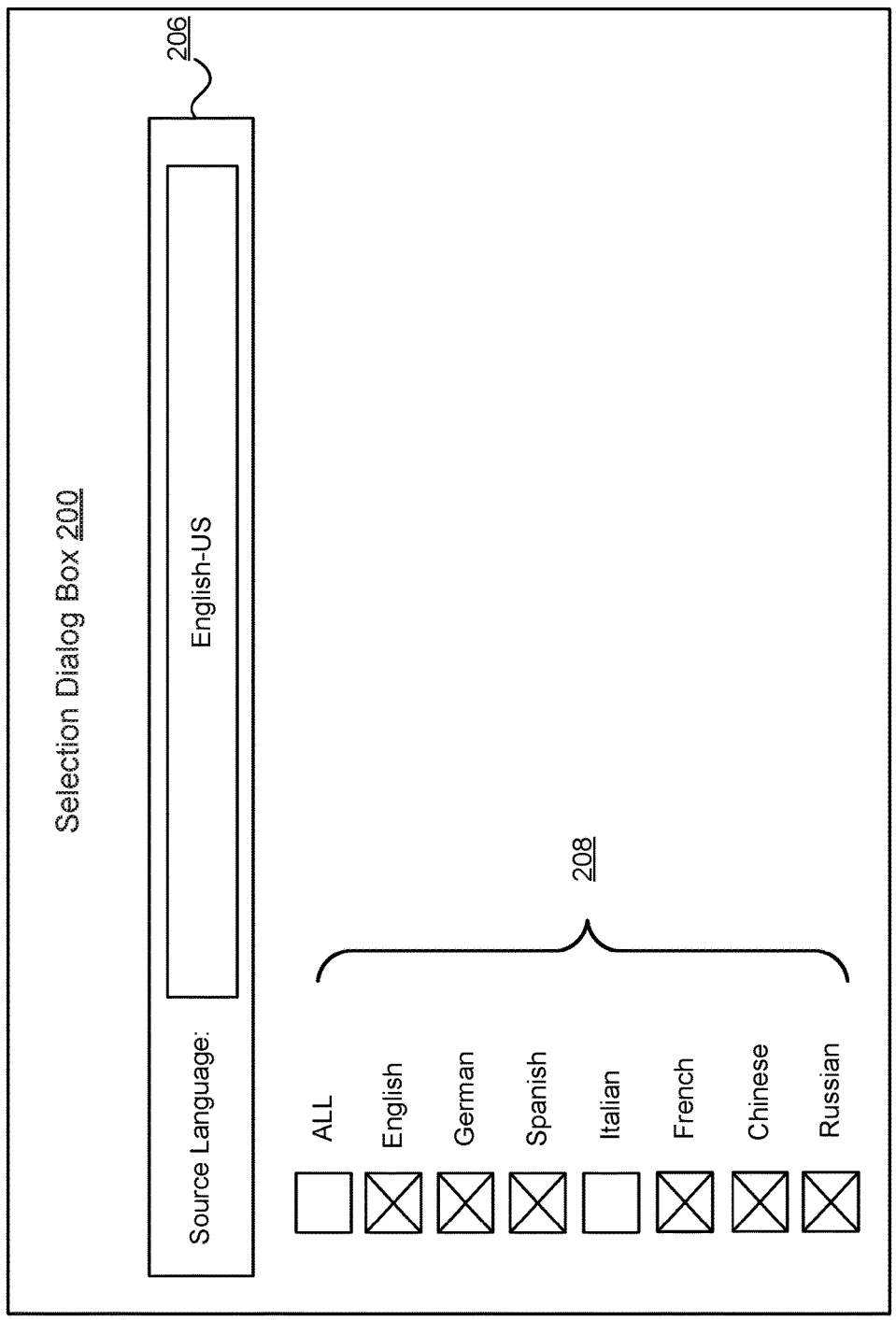
FIG. 2A depicts an example embodiment of a selection dialog box configured according to the techniques described herein.

FIG. 2A depicts an example embodiment of a selection dialog box. In the illustrated embodiment, selection dialog box 200 includes a text entry field 206 for entering the source language and a listing of available languages 208 for the source language to be translated into. As shown, the United States version of English has been selected as the source language in the text entry field 206. The translated languages 208 for selection include English, German, Spanish, Italian, French, Chinese, and Russian. Embodiments are configured to accommodate any translation into any available language.

FIG. 2B depicts an example embodiment of a translation vector selection menu comprising a plurality of translation vectors. The translation vector selection menu 224 includes a listing of translation vectors 210. In the illustrated embodiment, translation vector 212 has been selected as the intended meaning for translation. In one embodiment, the selection can be made by a user (e.g., graphical interface developer or other visual designer). As shown, the English word "send" has been translated into Chinese, French, Spanish, German, and Russian. The selected translation vector 212 corresponds to the intended meaning of the English word "send" into the various target languages as shown. In one embodiment, this process may be performed by a UI text space calculation unit discussed below.

In one embodiment, the translation vectors may include a separate field to provide explanations to the users. This could be done manually by users or could be automated. Translators might have the means to enter text that explains how each translation vector differs from the others. For example, one vector for the source text "supply" might be interpreted as "noun, stock of materials etc.", while another might be interpreted as "verb, provide materials for production, etc." Such explanations could be displayed in a separate field in the translation vector selection menu 224 to facilitate users choosing the correct vector even if the user is not capable of speaking all of the languages.

Figure 3:
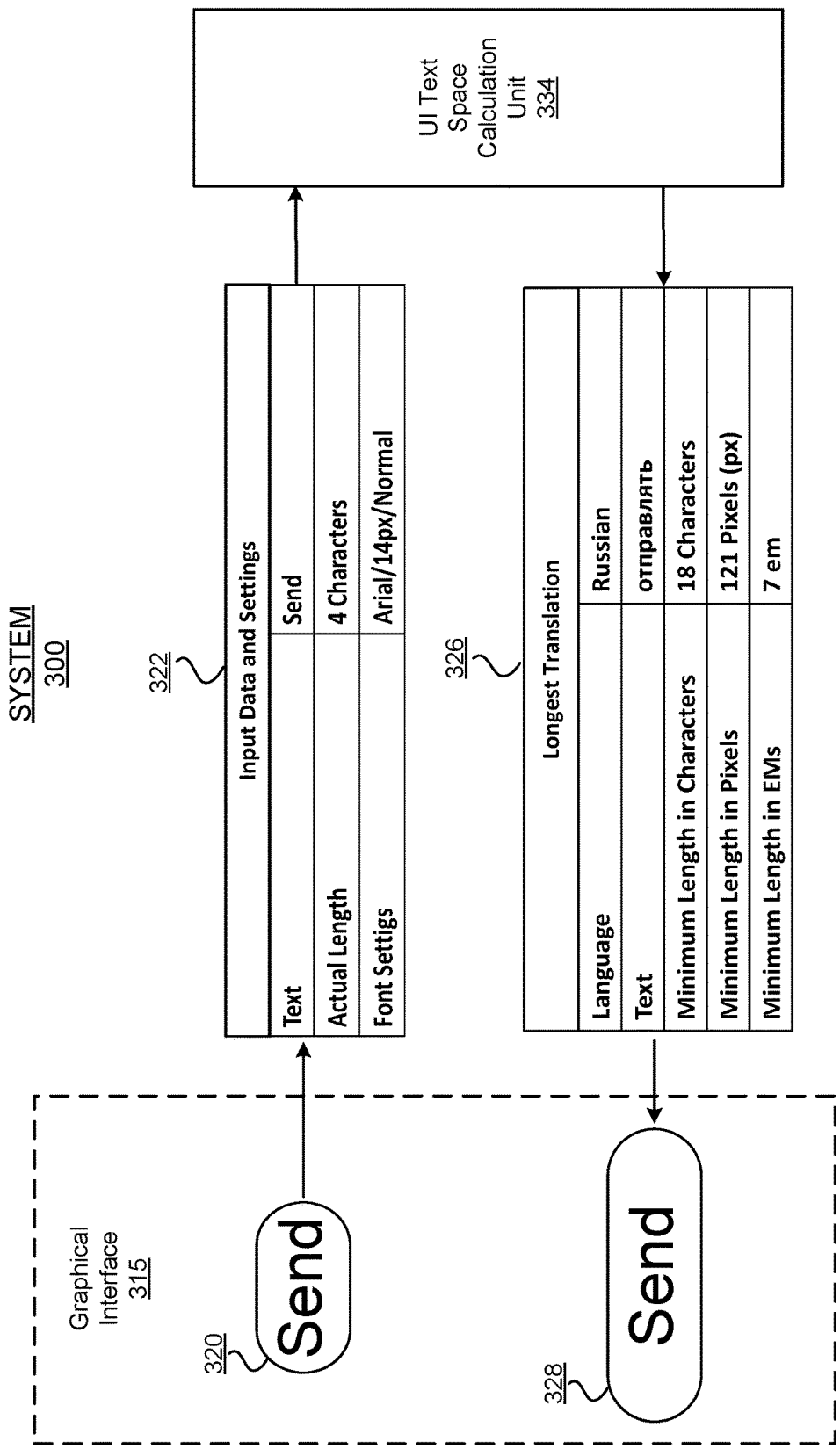
FIG. 3 depicts a conceptual block diagram of an example embodiment of a system configured according to the techniques described herein.

FIG. 3 depicts a conceptual block diagram of an example embodiment of a system configured according to the techniques described herein. In the illustrated embodiment, system 300 includes a graphical interface 315 and a UI text calculation unit 334. The graphical interface 315 includes a display element 320 containing the English source text string "send". As shown, the display area of the display element 320 is optimized for the English version of the text string.

In at least certain embodiments, when a user (e.g., graphics designer) enters the text string "send" into the display element 320, the input data and settings 322 corresponding to the text string may be sent to the UI text space calculation unit 334. As shown, the input data and settings 322 may include the source text of the text string "Send", the actual length in characters of the source text string in the source language (English). In other embodiments, the actual length may be provided in number of pixels ("px") or EM units.

An "EM" is a unit used in typography to measure the width and height of printed matter in comparison to the used type. One EM unit equals the height of a capital character in its current font and styling. For example, 1 EM in a 16-point typeface usually comprises 16 points. Although originally used to measure height, the unit EM is also frequently used to measure width. For example, a horizontal width of 2 EM units makes a visual element twice as wide as a character is high.

Currently for the Internet, EM is the predominant measure for text width (length) and display element sizes. To give translators an idea of how much space is available for a particular translation, the maximum number of characters may be restricted. This restriction however is not very precise. Screens differ in fonts, font-sizes, font-weights etc., and characters within a font may differ in width. Therefore, the number of characters is only a rough estimation of the actual available space. For example, the terms "iiii" and "MMMM" have the same number of characters, but different widths. The terms "mmmm" and "mmmm" are also equal, but the bold font-weight of the latter increases the text string's width. To provide a better way for spacing translations for UIs additional units of measure may be used, or a combination of units of measure may be used and the results averaged.

For example, the length of a source text string may be given in number of characters, number of pixels, number of EM units, or any combination thereof. In one embodiment, the UI text space calculation unit 334 may be configured to calculate all three values of number of characters, pixels, and EM units. The number of characters may be calculated first as a best guess where no more precise measure is available. The number of pixels may then be calculated, where required, especially in screen-driven environments such as C++ based development of applications. The number of EM units may lastly be calculated, e.g., for the web.

In FIG. 3, the input data and settings 322 also includes the font settings "Arial/14px/Normal". This information is provided to the UI text space calculation unit 434. In response, the UI text space calculation unit 434 provides to the graphical interface 315 information relating to the longest translation 326. In the illustrated embodiment, the longest translation 326 specifies the language (Russian) for the longest translation and the text of the longest translation (" Отправить "). The longest translation 326 further specifies the minimum length of the longest translation in characters (18 chars), in pixels (121 px), and in EM units (7 EM). One or all of these units of minimum length may be provided by the UI text space calculation unit 434 to the graphical interface 315.

The information relating to the longest translation 326 may be received at the graphical interface 315 of the client system and used to adjust the size of the display elements. In one embodiment, the display size can be adjusted manually by a user. In alternative embodiments, a mechanism may be used to automatically resize the display elements. As shown, the adjusted display element 328 comprises a display area that is larger than the previous display area of the original display element 320. In this case, the display area of the display element 328 accommodates all of the translations of the text string "send" in the selected translation vector in all of the designated target languages, including the longest translation in Russian.

Figure 4A:
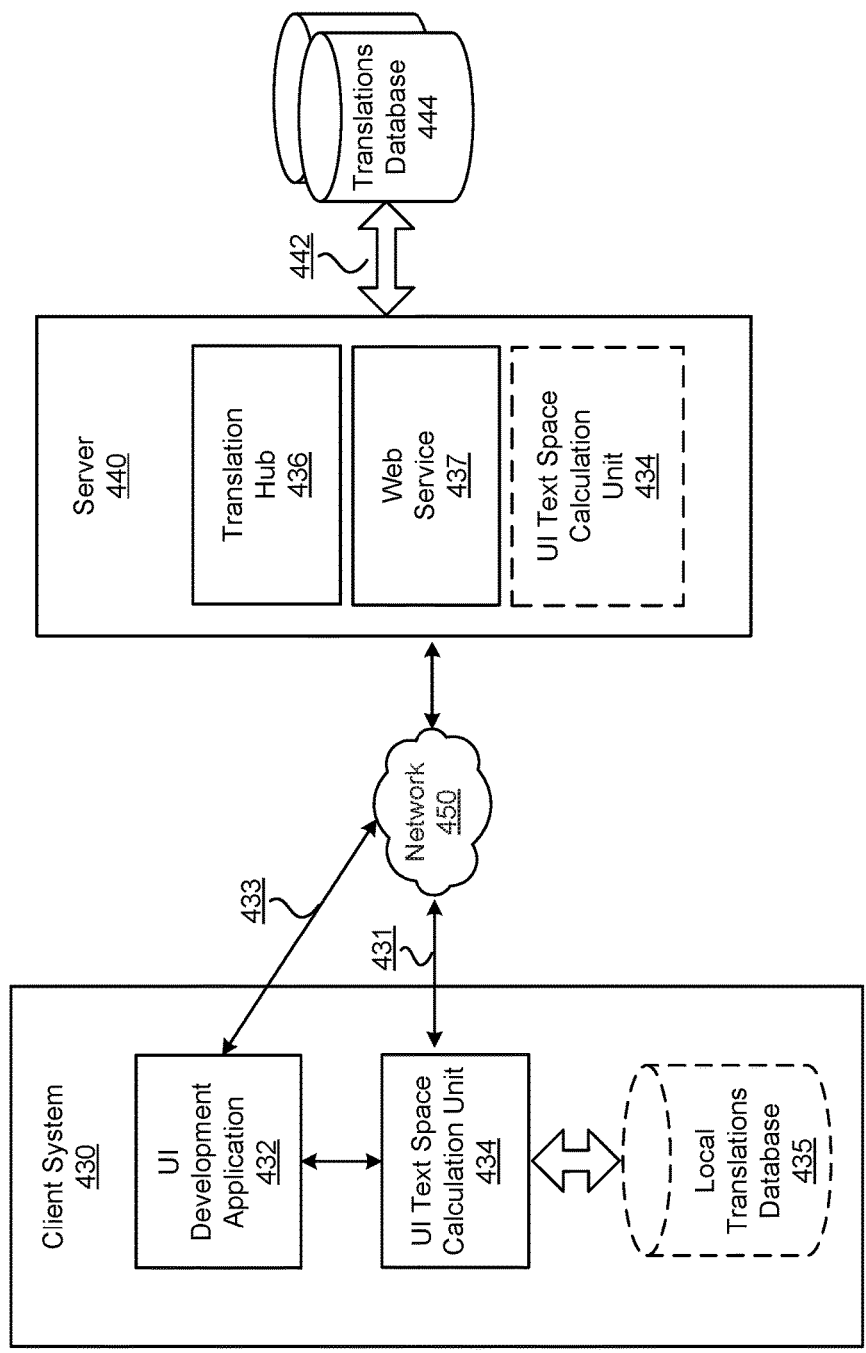
FIG. 4A depicts a block diagram of an example embodiment of a system configured according to the techniques described herein.

FIG. 4A depicts a block diagram of an example embodiment of a system configured according to the techniques described herein. In the illustrated embodiment, a client system 430 is in communication with a server computer 440 over one or more communications networks 450. The server 440 is further in communication with a translations database 444 via one or more communications links 442. The client system 430 includes a UI development application 432, a UI text space calculation unit 434, and, optionally, a local translations database 435. The server 440 includes a translation hub 436, a web service 437, and, optionally, the UI text space calculation unit 434.

As shown, the UI text space calculation unit 434 is associated with a UI development application 432. This is shown by way of illustration and not of limitation as any software tool used to design and/or implement graphical interfaces or other visual designs can be used with the UI text space calculation unit 434. In one embodiment, the UI text space calculation unit 434 may be a plug-in to the UI development application 432. Alternatively, it may be a monolithic piece of software integrated into the UI development application 432 that runs in its framework, or it may be a stand-alone piece of software stored in local memory at the client system 430. For example, the UI text space calculation unit 434 may be a single file that a user can download and plug into a particular design software tool. The file may contain executable code needed to calculate the area covered by text strings and integrated within its environment. The UI text space calculation unit 434 can also either optionally contain a local database of translations 435, or contain code adapted to create, fill, and read such a translations database 435 stored in local memory of the client's system 430.

In addition, the UI text space calculation unit 434 may be distributed over a network of machines. For example, the file that the user downloads may only contain the plug-in code to integrate with the environment. To calculate the necessary visual element display area to accommodate the input text string, the UI text space calculation unit 434 plug-in may issue a request to a cloud service. The cloud service in turn may forward translation requests to several translation services and databases to compile a response.

The UI text space calculation unit 434 may be applied to any development environment and in any programming language. For example, it could be part of mockup tools such as Balsamiq and integrated development environments such as Eclipse, Microsoft Visual Studio, Adobe DreamWeaver for websites, SAP Web IDE, or SAP GUI. In other fields, the UI text space calculation unit 434 may be plugged into other software used to create designs, such as Microsoft Word, Adobe InDesign, Adobe Illustrator for print layout, Adobe Photoshop and Corel Photo Paint for overlay text strings in image editing, 3-D modeling and animation software like Autodesk's Maya, and various computer-assisted drawing (CAD) tools for technical drawing.

As shown, the client system 430 may be configured to communicate with server computer 440 via one or more communication networks 450. The server 440 can be configured to perform data accesses operations on data stored in translations database 444 via a communications link 442. As will be appreciated by persons of skill in the art, network(s) 450 may be implemented as a single wired or wireless network, or multiple separate networks in communication with one another. Network(s) 450 may be implemented as any wired or wireless network(s). For example, the networks described herein can be implemented as a local area network ("LAN"), wide-area network ("WAN"), combination of LANs and WANs, the Internet, or any other type of communication network adapted for communicating electronic messages and information.

Further, network(s) 450 may be implemented as a physical array of hardware resources or as a virtual array, or any combination thereof. Network(s) 450 may also be implemented in a cloud-based network configuration. For example, network(s) 450 may be implemented as public or private cloud network, or combination thereof. No specific network or network architecture should be construed as limiting the embodiments and techniques described herein. Once a user enters a text string into a display element in a graphical display for the UI development application 432, the UI text space calculation unit 434 may communicate the text string in the source language, including its input data and settings, to the server 440 via network 450 as shown by connection 431 in FIG. 4A. Alternatively, the UI development application 432 may communicate this information directly to the server 440 over network 450 as shown by connection 433.

The server 440 may be implemented as an individual computer hardware server or as an array of computer hardware servers logically connected together and working in a functionally coordinated manner. Generally, a data server comprises a system configured to perform data access operations with respect to data stored in one or more repositories of data (e.g., database(s) 444). Depending on the type of server 440, data operations may range from simple operations, such as storing and retrieving data, to more complex operations such as computing process or calculating statistics based on the data; or arranging, modifying, or formatting data.

Server 440 is in communication with one or more translations databases 444 adapted to store translations in a plurality of different languages. In one embodiment, server 440 may be in remote communication with the database 444 via one or more networks 442. Alternatively, database 444 may be a component of the server 440 and configured to communicate with the server 440 via a direct or indirect connection or network 442. Database(s) 444 may be implemented as any type of database system. One example embodiment includes a relational database system in which data is stored in structured database tables comprised of rows and columns, and accessed through data storage rules (or schemas). Other examples of database systems 444 include event-based systems where data can be stored in a semi-structured or unstructured format.

A network communications interface (not shown) of the server 440 may be adapted to receive the source text string in the source text language from the UI text space calculation unit 434 (or UI development application 432) at the client system 430. The translation hub 436 of the server 440 may be adapted to query the translations database 444 to retrieve one or more translations of the source text string for each of the selected target languages specified by the user. The translation hub 436 may then provide a set of translation vectors to the UI text space calculation unit 434 of client system 430 corresponding to each of the different potential translations of the source text string. In one embodiment, the optional local translations database 435 stored at the client system 430 may be accessed by the UI text space calculation unit 434 in order to provide the set of translation vectors instead of the translations database 444. The set of translation vectors may comprise alternative translations of the source text string to account for ambiguities in the source language. As discussed above, text translation does not always result in a one-to-one correspondence between the source and target languages. A single word in English, for example, can have multiple translations in another language as shown in FIG. 2B above.

In alternative embodiments the UI text space calculation unit 434 may be located within server 440 instead of at the client system 430. In such cases, the functionality of the UI text space calculation unit 434 may be provided as a web service via one or more web services 437 at the server 440. In one embodiment, the UI text space calculation unit 434 may be implemented as a cloud platform service for the client system 430. It can be run for all web applications and web application types. It can provide quality checks, incident processing, as well as the novel translation-based visual design processes described herein.

Figure 4B:
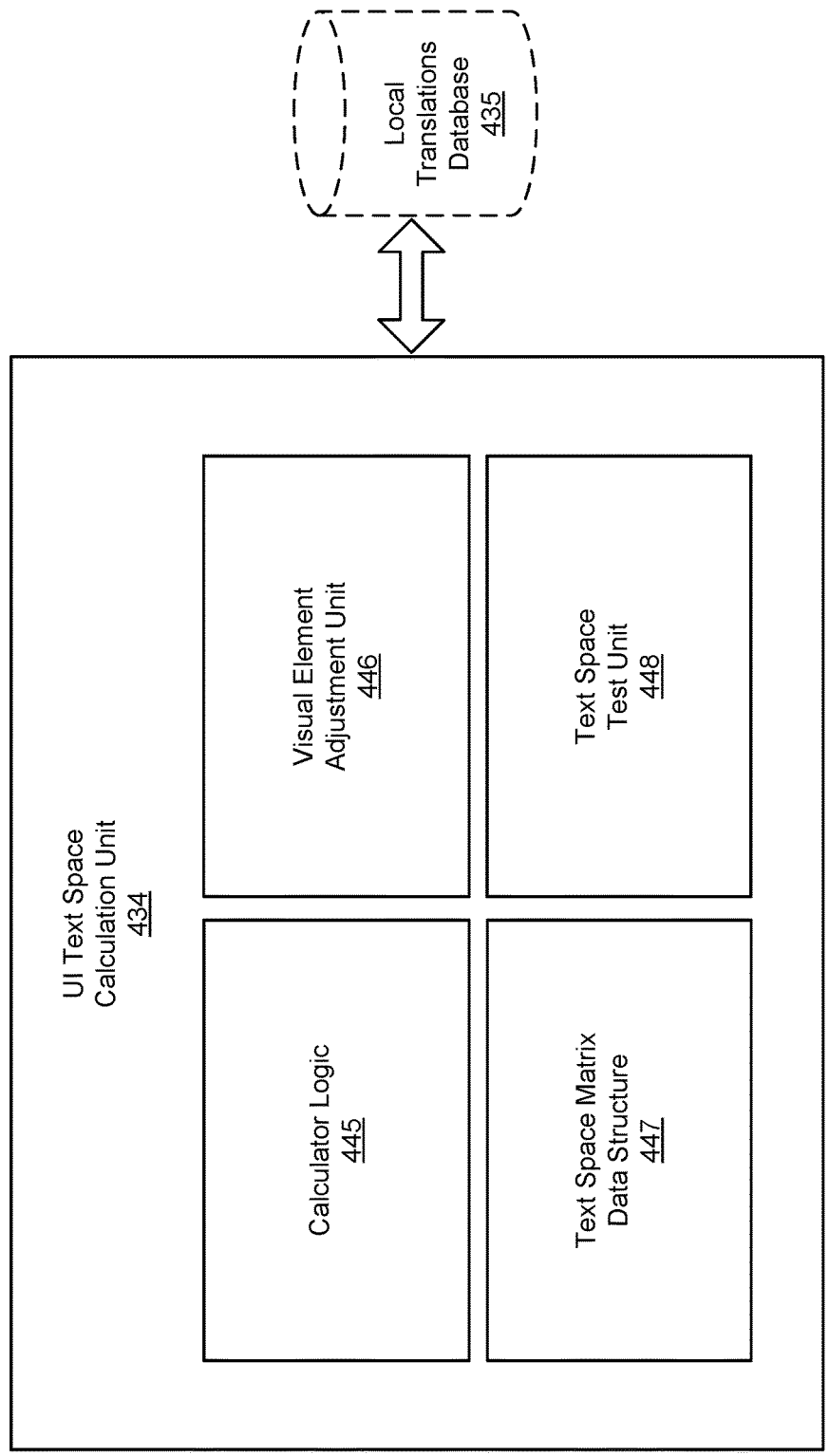
FIG. 4B depicts a block diagram of an example embodiment of a user interface calculation unit configured according to the techniques described herein.

FIG. 4B depicts a block diagram of an example embodiment of a user interface calculation unit configured according to the techniques described herein. In the illustrated embodiment, the UI text space calculation unit 434 comprises calculator logic 445, one or more text space matrix data structures 447, a visual element adjustment unit 446, a text space test unit 448, and, optionally, a local translations database 435. The calculator logic 445 may be adapted to calculate the minimum display area necessary for a visual element to display the longest translation of the text string in a selected translation vector.

Calculating the width (length) of a text string is quite complex, but can be made easy by using the correct execution environment. One embodiment employs JavaScript in a web browser (not shown) to simplify the task. For example, developing a class in Advanced Business Application Programming ("ABAP"—the high-level programming language created by the German software company SAP) that calculates the length of a text in pixels, depending on parameters such as font, font-size, font-weight, etc., is a task that can keep several developers going for weeks. However, every web browser already performs this task because it is needed to calculate the layout of the web pages it displays. In one embodiment the task may simply comprise adding an HTML element with the text string, styling it to the required font etc., and reading the resulting size using JavaScript code.

In one embodiment, calculating the minimum display area to accommodate the longest translation comprises calculating the length of the source text string in each of the target languages and determining a minimum length of the source text string of the longest translation. The minimum length of the source text string for the longest translation may correspond to its number of characters, number of pixels, or number of EM units required to display the longest translation in the display area of a visual element. In at least certain embodiments, both the length and the height of the display area of the visual element may be calculated by the calculator logic 445. In software development, the fact that visual elements do not provide sufficient horizontal space for text strings is normally encountered, however, this is only one dimension. In other fields, it may be necessary to calculate the rectangular width and height occupied by the text string. The text string may also be required to fit into an irregular area, such as a circle. In three-dimensional fields, the text may even need to fit into an area that includes depth as a third dimension.

The UI text space calculation unit 434 can be adjusted to calculate the required visual area for all of these cases and suggest corresponding output. The higher-dimensional and more irregular the forms become, the more complex the calculation may be. The text space matrix data structure 447 may be utilized to assist in the calculation. For cases where no translations are yet available for a text string, the system can be adapted to calculate a best guess. Table 1 below depicts one embodiment of a text space matrix data structure 447 that can be utilized for providing a recommended minimum text string length (in characters, pixels, and/or EM units) corresponding to the length of the source text string in characters as shown below:

TABLE 1

| Length of Source Text String in Characters | Recommended Minimum Text String Length | | |
|---|---|---|---|
| | 1. In Characters | 2. In Em | 3. In Pixels |
| 1-4 | 10 | 66% of numbers of characters in EM (e.g., 17 EM for 26 characters) | Text Pixel Length Matrix (not shown) |
| 5 | 14 | | |
| 6 | 16 | | |
| 7 | 18 | | |
| 8-10 | 20 | | |
| 11 | 22 | | |
| 12 | 24 | | |
| 13-15 | 26 | | |
| 16 | 28 | | |
| 17-20 | 30 | | |
| 21-80 | +50% e.g. 60 for 40 characters | | |
| 81+ | +30% e.g. 120 for 90 characters | | |

As shown in Table 1, for source text string lengths of 1 to 4 characters, the recommended minimum text string length is 10 characters. For 5 characters, the recommended minimum text string length is 14 characters, and so on down to 20 characters. For a source text string length of 21-80 characters, the recommended minimum text string length may include the 30 characters plus an additional 50% of the characters in the source text string. For a source text string length of 81 or more characters, the recommended minimum text string length includes the 30 characters plus 30% of the characters in the source text string.

For EM units, the number of EM units may be equal to 66% of the number of characters in the source text string. And for pixels, a text pixel length matrix (not shown) may be provided. Other ranges of recommended minimum text string lengths may be utilized, and the embodiments described herein are not limited to the particular embodiment reflected in Table 1. This can also be configured by the user.

The visual element adjustment unit 446 may then be utilized to adjust the display area of visual elements in the graphical interface of the client system 430 to conform to the recommended minimum text string lengths from the UI text space calculation unit 434. In one embodiment, this may be automated based on receiving the recommendations from the UI text space calculation unit 434. Alternatively, the recommendations can be displayed to a user who can then manually adjust the display area of the visual elements in the graphical interface.

The text space test unit 448 may be adapted to receive an existing graphical interface design with visual elements having a display area containing existing source text strings and receive one or more input additional target languages for the existing source text string to be translated into. The text space test unit 448 may then obtain translations of the source text string in the selected additional languages and calculate the minimum display area necessary for the existing visual element to display any updates to the longest translation of the existing source text string to fit within the display area of the existing visual elements in the display. In addition, at least certain embodiments may be configured for testing additional user interface designs (or other visual designs) based on receiving an existing graphical interface design having one or more visual elements and testing it by calculating a minimum display area necessary for each of the visual elements in the existing design. This can be used to validate legacy graphical interfaces that were developed with unsupported translation before. It can also be used to create tests to check work on a continual basis to ensure that changes do not break a particular visual design. For example, the UI text space calculation unit 434 can be run on a nightly basis to check graphical interfaces in all supported languages.

Moreover, the UI text space calculation unit 434 may also be applied to simulate the effects of adjusting the range of supported languages. Changing the range of target languages and running the UI text space calculations over the visual interfaces can provide a what-if picture of the effort that would be caused by such a change. For example, if an application developer wants to decide what it will cost to move into a new market with a new language, the embodiments described herein can be used to simulate activating a new language for that market. In this example, it may be determined after the simulation that now 500 visual elements in the application are no longer sufficient to cover the longest translation in the chosen new language. Thus the developer can utilize the system to quantify the effort and cost required to move into the new market.

Figure 5:
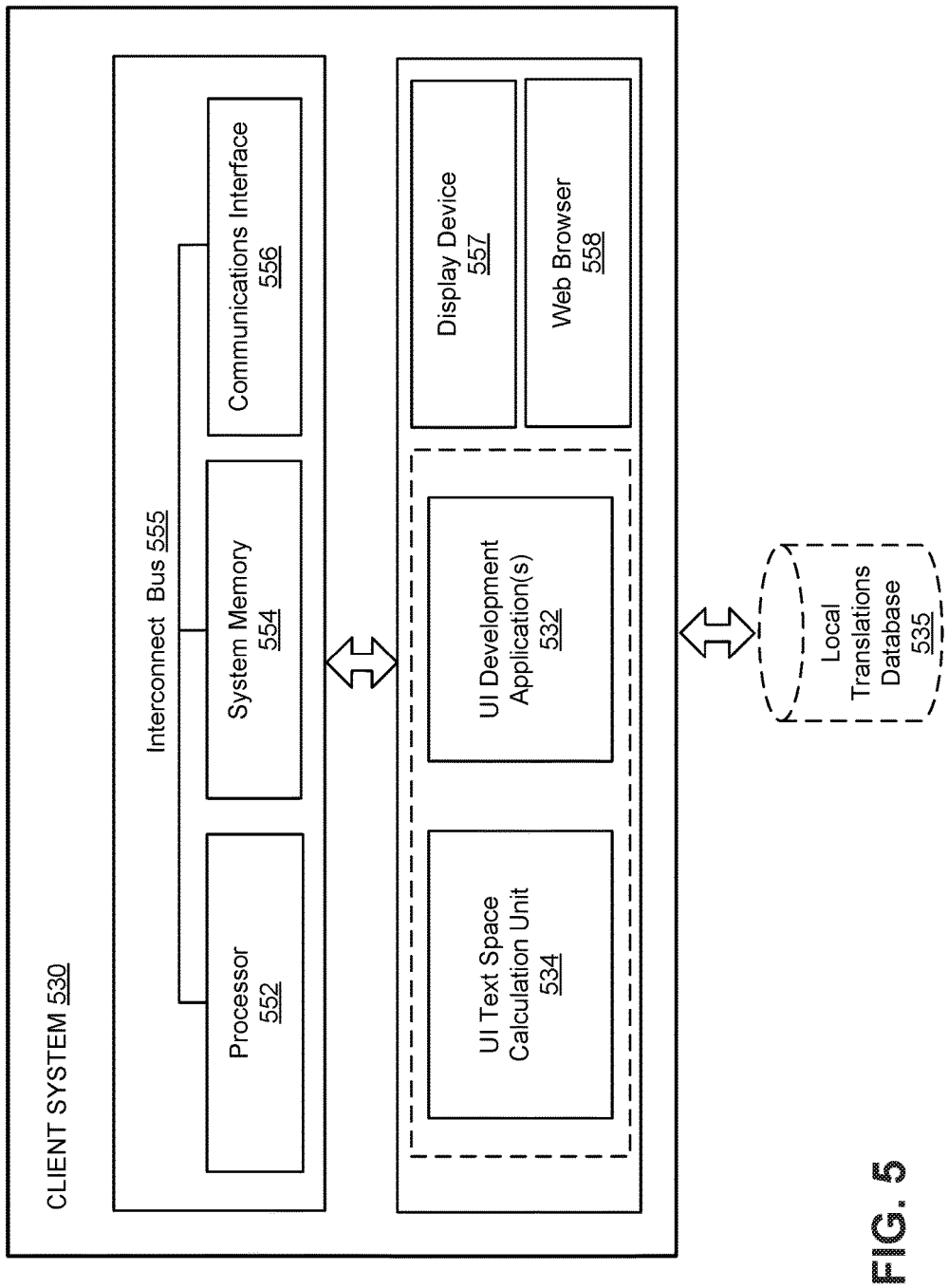
FIG. 5 depicts a block diagram of an example embodiment of a client system configured according to the techniques described herein.

FIG. 5 depicts a block diagram of an example embodiment of a client system configured according to the techniques described herein. In the illustrated embodiment, client system 530 includes a processor 552, a system memory 554, and a communications interface 556 in communication together via one or more interconnect buses 555. Client system 530 further includes a UI text space calculation unit 534 in communication with one or more UI development applications 532. As discussed above, the UI text space calculation unit 534 can be integrated with the UI development applications 532 as plug-in software, a monolithic piece of software code integrated into the UI development applications 532, or as a stand-alone software program stored on the client system 530.

Client system 530 may further include a display device 557 and a web browser 558 for communications with a web service in the translation server. In one embodiment, the client system 530 may also include a local translations database 535.

Figure 6:
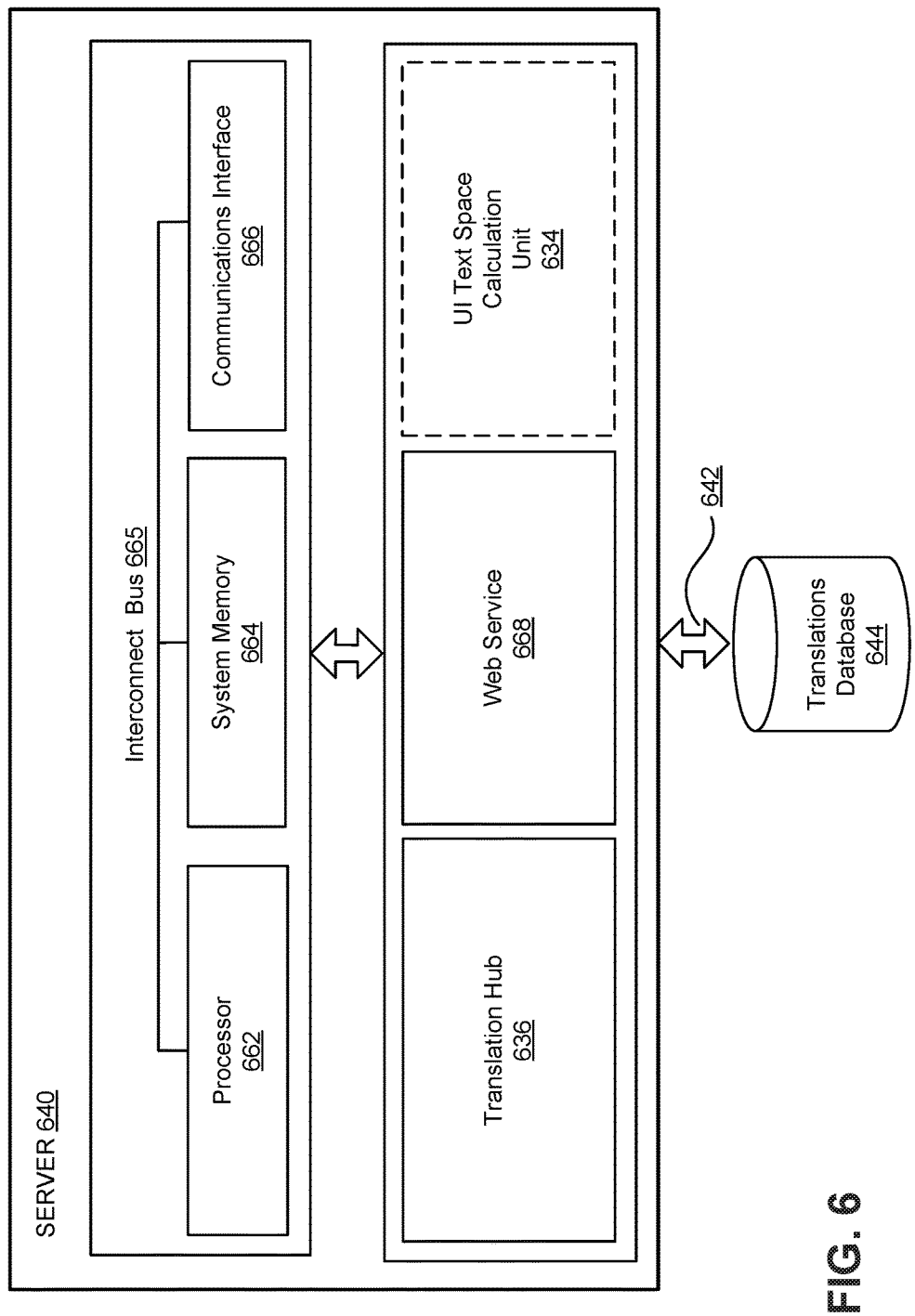
FIG. 6 depicts a block diagram of an example embodiment of a computer server with a translation hub configured according to the techniques described herein.

FIG. 6 depicts a block diagram of an example embodiment of a computer server with a translation hub configured according to the techniques described herein. In the illustrated embodiment, server 640 includes a processor 662, a system memory 664, and a communications interface 666 in communication together via one or more interconnect buses 665. The server 640 is also in communication with the translations database 644 via one or more communications links 642.

Server 640 further includes a translation hub 636 configured to retrieve one or more translation vectors to provide to the client system as discussed above. The server 640 may be configured to receive requests from the UI text space calculation unit of the client system over one or more networks to retrieve a set of translation vectors. The server 640 may query the translations database 644 to retrieve the set of translation vectors and provide a response to the client system comprising the set of translation vectors.

As discussed above, server 640 may optionally include the UI text space calculation unit 634. Web service 668 may be provided to facilitate web-based communications between the client system and the UI text space calculation unit 634 stored on the server 640 so the users can utilize the UI text space calculation unit 634 as a service instead of storing it on their own client systems.

I. Exemplary Processes

The following figures depict example flow charts illustrating various embodiments of a process for accommodating a plurality of translations of a source text string into a limited available display area of a visual element in a graphical interface of a client computer system according to the techniques described herein. It is noted that the processes described below are exemplary in nature and are provided for illustrative purposes and not intended to limit the scope of the disclosure to any particular example embodiment. For instance, methods in accordance with some embodiments described herein may include or omit some or all of the operations described below, or may include steps in a different order than described herein. The particular methods described are not intended to be limited to any particular set of of operations exclusive of all other potentially intermediate operations.

In addition, the operations may be embodied in computer-executable code, which causes a general-purpose or special-purpose computer to perform certain functional operations. In other instances, these operations may be performed by specific hardware components or hardwired circuitry, or by any combination of programmed computer components and custom hardware circuitry.

FIG. 7A depicts a flow chart of an example embodiment of a process for accommodating a plurality of translations of a source text string into a limited available display area of a visual element in a graphical interface of a client computer system according to the techniques described herein. In the illustrated embodiment, process 700 begins at operation 701 by receiving an input source text string in the display area of the visual element. The source text string can be entered by a user in a graphical interface associated with a UI development application environment. This can be accomplished by running the UI text space calculation unit discussed above in a functionally coordinated manner with the UI development application in the client system. In one embodiment, the UI text space calculation unit comprises a plug-in program that plugs into the UI development application environment. In alternative embodiments, the UI text space calculation unit may comprise a monolithic piece of software code integrated into the UI development application or a standalone process stored in memory on the client system.

Process 700 continues by receiving input specifying a source language for the source text string (operation 702) and receiving input selecting one or more target languages for the source text string to be translated into (operation 703). In response to the input source text string, translations of the source text string in the selected languages may be obtained (operation 704) and a set of one or more translation vectors may be displayed in the graphical interface of the client system (operation 705). In one embodiment, the translations of the source text string are obtained from a translations database over a communications network. Alternatively, the translations of the source text string may be obtained from a local database stored in the client system. Each translation vector of the set of translation vectors may include a possible translation of the source text string for each of the selected languages. Process 700 continues by receiving a selection of the translation vector that contains a translation of the source text string corresponding to its intended meaning (operation 706). In one embodiment, the selection of the translation vector is received from a user (e.g., application graphical interface developer) at the client system.

Process 700 continues in FIG. 7B. Once the above input is received, process 700 continues by calculating a minimum display area necessary for the visual element to display a longest translation of the translations in the selected translation vector (operation 707). The display area of the visual element in the graphical interface can then be adjusted to encompass the minimum display area such that the longest translation fits within the display area of the visual element (operation 708). The display area of the visual element in the graphical interface can either be adjusted manually by the UI developer or adjusted automatically by the UI text space calculation unit.

The minimum display area may correspond to a minimum length of the longest translation. The minimum length of the longest translation may correspond to a length in number of characters, number of pixels, or number of EM units required to display the longest translation in the visual element. In addition, the set of translation vectors may comprise alternative translations of the source text string to account for ambiguities in the source language. As discussed above, text translation does not always result in a one-to-one correspondence between the source and target languages. A single word in English, for example, can have multiple translations in another language.

Process 700 continues in FIG. 7C by receiving an existing graphical interface design including at least one existing visual element having a display area containing an existing source text string (operation 709), receiving a selection of one or more additional target languages for the existing source text string to be translated into (operation 710), obtaining translations of the source text string in the selected additional languages (operation 711), and calculating a minimum display area necessary for the existing visual element to display an updated longest translation of the existing source text string to fit within the display area of the existing visual element (operation 712). A request can be communicated from the client system to a server over a communications network to retrieve the set of translation vectors from a translations database. The server can then query the translations database to retrieve the set of translation vectors and provide those translation vectors in a response to the client system. This completes process 700 according to one example embodiment.

A weighting factor for each of the selected languages to be translated can be received as an input to the UI text space calculation unit indicating the level of importance of each of the languages for purposes of translation. When the UI text space calculation unit performs its translation process, it can calculate weighted averages from the weighting factors, and remove outliers whose weighted averages lie below the threshold. For example, users may assign a factor between 0.0 and 1.0 to each target language, ranging from 0.0 for "not interested" to 1.0 for "absolutely vital". The UI text space calculation unit may use these factors to calculate a weighted average between 0.0 and 1.0 that describes how good the current design fits with its intended target market(s). A company may choose 1.0 for its English primary market, but may set Chinese to 0.7 and Arabic to 0.4 to ensure that too many difficulties will not be encountered when expanding into these foreign markets later on.

In addition, at least certain embodiments are configured for outlier removal. Many implementers may be satisfied if their work includes a 95% good design. The remaining 5% outliers, possibly resulting from overly elaborate or exotic languages and texts, may be well acceptable. For example, assume that the word "send" shall be translated into 100 languages. The translations for 98 languages fit into a display element (e.g., button) with 200 pixels. But two languages deviate heavily from this and would require the visual element to be 300 pixels wide. The UI text space calculation unit may apply outlier removal to ignore such deviations. One way to achieve this would be to let the user (e.g., designer) enter a threshold value between 0.0 and 1.0 that specifies how good the results should be, with 0.0 for "do not care at all" to 1.0 for "all languages must fit perfectly," etc. In the example above, the user could enter a value of 0.95, meaning that 95% of all translations must fit into the visual element, to ignore the two outlier languages.

As an example, an English text string may comprise 7 characters and the recommendation from the system is 18 characters of a language vector having English, German, French, Japanese, Spanish, Portuguese, and Standard Mandarin. If the Russian translation requires 22 characters according to the translations in the translation repository and the second longest translation (Portuguese) requires 15 characters, the calculator logic may return 15 characters instead of 22 characters in order to remove the Russian outlier and avoid too much white space, which may be very important from a user interface designer's perspective.

In addition, above we described integration of the various embodiments into the visual design process itself. But at least certain embodiments may be configured for testing additional user interface designs (or other visual designs). The system may be adapted to receive an existing graphical interface design having one or more existing visual elements and testing the existing graphical interface design by calculating a minimum display area necessary for each of the existing visual element in the existing design. This can be used to check legacy graphical user interfaces that were developed with unsupported translation before. It can also be used to create tests to check work on a continual basis to ensure that changes do not break a particular visual design. For example, the UI text space calculation unit can be run on a nightly basis to check all graphical interfaces in all supported languages.

Source Language

Although English is the prevalent language in software development, it is not the only one. In other areas of design work, chances are high that the source text strings may be produced in a language other than English. Most of the UI text space calculation unit is able to deal with this out-of-the-box—other source languages simply permute the contents of the translation vectors; all the rest works as is. The thing to be adjusted is recalculating the text space matrix 447, as described above, for the other source language(s). In one embodiment, this may be accomplished by automating the statistical analysis used to calculate the matrix for English and applying it to the other source languages. The statistical analysis can be done once for all major languages to provide the UI text space calculation unit with a comprehensive set of default matrixes.

Language Evolution

In addition, languages evolve slowly over periods of hundreds of years. Fast changes occur only seldom, e.g., through a spelling reform, and are likely to not influence the text space matrix. What changes faster, though, is the content of the translations database. To accommodate for the steadily growing basis of the numbers, the calculation can be repeated on a regular or on-demand basis, updating the text space matrix as appropriate.

II. Exemplary Hardware Implementation

Embodiments of the present disclosure may be practiced using various computer systems including hand-held devices, microprocessor systems, programmable electronics, laptops, tablets and the like. The embodiments can also be practiced in distributed computing environments where tasks are performed by remote processing devices that are linked through one or more wire-based or wireless networks.

FIG. 8 depicts an example overview block diagram of a data processing system upon which the embodiments described herein may be implemented. It is to be understood that a variety of computers configurations may be used to implement the described techniques. While FIG. 8 illustrates various components of a data processing system 800, it is not intended to represent any particular architecture or manner of interconnecting components. It will also be appreciated that network computers and other data processing systems, which have fewer components or additional components, may be used. The data processing system 800 may, for example, comprise a personal computer (PC), workstation, laptop computer, tablet, smartphone or other hand-held wireless device, or any device having similar functionality.

In the illustrated embodiment, data processing system 800 includes a computer system 810. Computer system 810 includes an interconnect bus 805 (or other communication mechanism for communicating information) and one or more processor(s) 801 coupled with the interconnect bus 805 for processing information. Computer system 810 also includes a memory system 802 coupled with the one or more processors 801 via the interconnect bus 805. Memory system 802 is configured to store information and instructions to be executed by processor 801, including information and instructions for performing the techniques described above. This memory system may also be used for storing programs executed by processor(s) 801. Possible implementations of this memory system may be, but are not limited to, random access memory (RAM), read only memory (ROM), or combination thereof.

In the illustrated embodiment, a storage device 803 is also provided for storing information and instructions. Typically storage device 803 comprises nonvolatile memory. Common forms of storage devices include, for example, a hard drive, a magnetic disk, an optical disk, a CD-ROM, a DVD, a flash or other non-volatile memory, a USB memory card, or any other computer-readable medium from which a computer can read data and instructions. Storage device 803 may store source code, binary code, or software files for performing the techniques above. In addition, while FIG. 8 shows that storage device 803 as a local device connected with the components of the data processing system, it will be appreciated by skilled artisans that the described techniques may use a storage device remote from the system, such as a database or other network storage device coupled with the computer system 810 through a network interface such as network interface 804.

Network interface 804 may provide communications between computer system 810 and a network 820. The network interface 804 may be a wireless or wired connection, or any combination thereof. Computer system 810 is configured to send and receive information through the network interface 804 across one or more networks 820 such as a local area network (LAN), wide-area network (WAN), wireless or Bluetooth network, or the Internet 830, etc. Computer system 810 may access data and features on systems residing on one or multiple different hardware servers 831-834 across the network 820. Hardware servers 831-834 and associated server software may also reside in a cloud computing environment.

Storage device and memory system are both examples of non-transitory computer readable storage media. Embodiments herein can be embodied in computer-readable code stored on any computer-readable medium, which when executed by a computer or other data processing system, can be adapted to cause the system to perform operations according to the techniques described herein. Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Computer-readable media can also be distributed over a network-coupled computer system stored and executed in a distributed fashion.

Further, computer system 810 may be coupled via interconnect bus 805 to a display 812 for displaying information to a computer user. An input device 811 such as a keyboard, touchscreen, and/or mouse is coupled to bus 805 for communicating information and command selections from the user to processor 801. The combination of these components allows the user to communicate with the system. In some systems, bus 805 represents multiple specialized interconnect buses.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a computer system. The techniques may be carried out in a computer system or other data processing system in response executing sequences of instructions stored in memory.

Throughout the foregoing description, for the purposes of explanation, numerous specific details were set forth in order to provide a thorough understanding of the disclosure. It will be apparent, however, to persons skilled in the art that these embodiments may be practiced without some of these specific details. The above examples and embodiments should not be deemed to be the only embodiments, and are presented to illustrate the flexibility and advantages of the present disclosure. Other arrangements, embodiments, implementations and equivalents will be evident to those skilled in the art and may be employed without departing from the spirit and scope of the disclosure as defined by the following claims.

What is claimed is:

1. A method for accommodating a plurality of translations of a source text string into a limited available display area of a visual element in a graphical interface of a client computer system, the method comprising:
receiving an input source text string in the display area of the visual element;
receiving input specifying a source language for the source text string;
receiving input selecting two or more target languages for the source text string to be translated into;
obtaining translations of the source text string in each of the selected two or more target languages;
displaying, in response to the input source text string, a set of translation vectors, each translation vector comprising one possible translation of the source text string for each of the selected two or more target languages;
receiving a selection of a translation vector that contains a translation of the source text string corresponding to an intended meaning of the source text string; and
calculating a minimum display area necessary for the visual element to display a longest translation of the translations contained in the selected translation vector,
wherein the display area of the visual element in the graphical interface is adjusted to encompass the minimum display area such that the longest translation fits within the display area of the visual element.

2. The method of claim 1 wherein the minimum display area corresponds to a minimum length of the longest translation.

3. The method of claim 2 wherein the minimum length of the longest translation corresponds to a length selected from the group consisting of number of characters, number of pixels, and number of EM units required to display the longest translation in the visual element.

4. The method of claim 1 wherein the set of translation vectors comprise alternative translations of the source text string to account for ambiguities in the source language.

5. The method of claim 1 further comprising:
receiving an existing graphical interface design including at least one existing visual element having a display area containing an existing source text string;
receiving a selection of one or more additional languages for the existing source text string to be translated into;
obtaining translations of the source text string in the selected additional languages; and
calculating a minimum display area necessary for the existing visual element to display an updated longest translation of the existing source text string to fit within the display area of the existing visual element.

6. The method of claim 1 further comprising:
communicating a request to a server over a communications network to retrieve the set of translation vectors, wherein the server is adapted to query a translations database to retrieve the set of translation vectors; and
receiving a response from the server comprising the set of translation vectors.

7. The method of claim 1 further comprising:
receiving an input weighting factor for each of the selected languages to be translated indicating its level of importance;
comparing the input weighting factor to a threshold; and
removing outlier translations with weighting factors below the threshold.

8. The method of claim 1 further comprising:
receiving an existing graphical interface design comprising one or more existing visual elements; and
testing the existing graphical interface design by calculating a minimum display area necessary for a longest translation in each of the existing visual element in the existing design.

9. The method of claim 1 wherein the display area of the visual element in the graphical interface is adjusted either manually by a user or automatically by a user interface text space calculation unit.

10. The method of claim 1 wherein the source text string comprises a font type and a font size.

11. A system comprising:
a computer device comprising a processor, graphical interface, and a system memory in communication with the processor via a communication medium, the system memory configured to store programmed computer code, which when executed by the processor, causes the processor to perform operations for accommodating a plurality of translations of a source text string into a limited available display area of a visual element in the graphical interface, the operations comprising:
receiving an input source text string in the display area of the visual element;
receiving input specifying a source language for the source text string;
receiving input selecting two or more target languages for the source text string to be translated into;
obtaining translations of the source text string in each of the selected two or more target languages;
displaying, in response to the input source text string, a set of translation vectors, each translation vector comprising one possible translation of the source text string for each of the selected two or more target languages;
receiving a selection of a translation vector that contains a translation of the source text string corresponding to an intended meaning of the source text string; and
calculating a minimum display area necessary for the visual element to display a longest translation of the translations contained in the selected translation vector, wherein the display area of the visual element in the graphical interface is adjusted to encompass the minimum display area such that the longest translation fits within the display area of the visual element.

12. The system of claim 11 wherein the minimum display area corresponds to a minimum length of the longest translation corresponding to a length selected from the group consisting of number of characters, number of pixels, and number of EM units required to display the longest translation in the visual element.

13. The system of claim 11 wherein the set of translation vectors comprise alternative translations of the source text string to account for ambiguities in the source language.

14. The system of claim 11 further comprising a server in communication with a database over a communications network, wherein the server is configured to:
receive a request from the computer device over the network to retrieve the set of translation vectors;
query a translations database to retrieve the set of translation vectors; and
communicate a response to the computer device comprising the set of translation vectors.

15. The system of claim 11 wherein the operations further comprise:
receiving an existing graphical interface design including at least one existing visual element having a display area containing an existing source text string;
receiving a selection of one or more additional languages for the existing source text string to be translated into;
obtaining translations of the source text string in the selected additional languages; and
calculating a minimum display area necessary for the existing visual element to display an updated longest translation of the existing source text string to fit within the display area of the existing visual element.

16. A non-transitory computer readable storage medium embodying programmed computer code, which when executed causes a computer system to perform operations for accommodating a plurality of translations of a source text string into a limited available display area of a visual element in a graphical interface, the operations comprising:
receiving an input source text string in the display area of the visual element;
receiving input specifying a source language for the source text string;
receiving input selecting two or more target languages for the source text string to be translated into;
obtaining translations of the source text string in each of the selected two or more target languages;
displaying, in response to the input source text string, a set of translation vectors, each translation vector comprising one possible translation of the source text string for each of the selected two or more target languages;
receiving a selection of a translation vector that contains a translation of the source text string corresponding to an intended meaning of the source text string; and
calculating a minimum display area necessary for the visual element to display a longest translation of the translations contained in the selected translation vector, wherein the display area of the visual element in the graphical interface is adjusted to encompass the minimum display area such that the longest translation fits within the display area of the visual element.

17. The computer readable storage medium of claim 16 wherein the minimum display area corresponds to a minimum length of the longest translation corresponding to a length selected from the group consisting of number of characters, number of pixels, and number of EM units required to display the longest translation in the visual element.

18. The computer readable storage medium of claim 16 wherein the set of translation vectors comprise alternative translations of the source text string to account for ambiguities in the source language.

19. The computer readable storage medium of claim 16 wherein the operations further comprise:
receiving an existing graphical interface design including at least one existing visual element having a display area containing an existing source text string;
receiving a selection of one or more additional languages for the existing source text string to be translated into;
obtaining translations of the source text string in the selected additional languages; and
calculating a minimum display area necessary for the existing visual element to display an updated longest translation of the existing source text string to fit within the display area of the existing visual element.

20. The computer readable storage medium of claim 16 wherein the operations further comprise:
receiving an existing graphical interface design comprising one or more existing visual elements; and
testing the existing graphical interface design by calculating a minimum display area necessary for each of the existing visual element in the existing design.

* * * * *